(No Model.)
R. J. MORRIS & R. L. WIGGINS.
MANURE DISTRIBUTER.
No. 488,445. Patented Dec. 20, 1892.
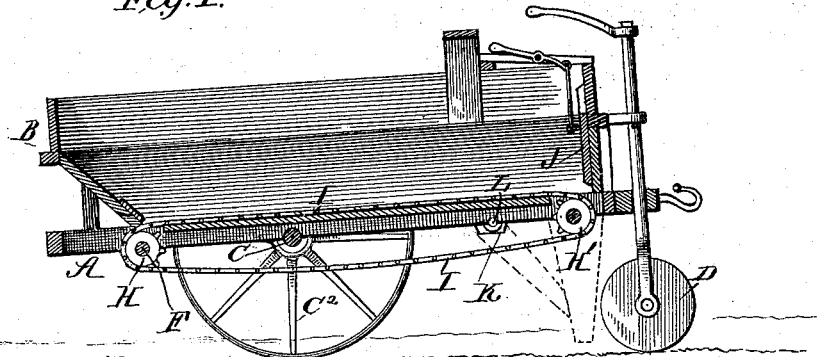
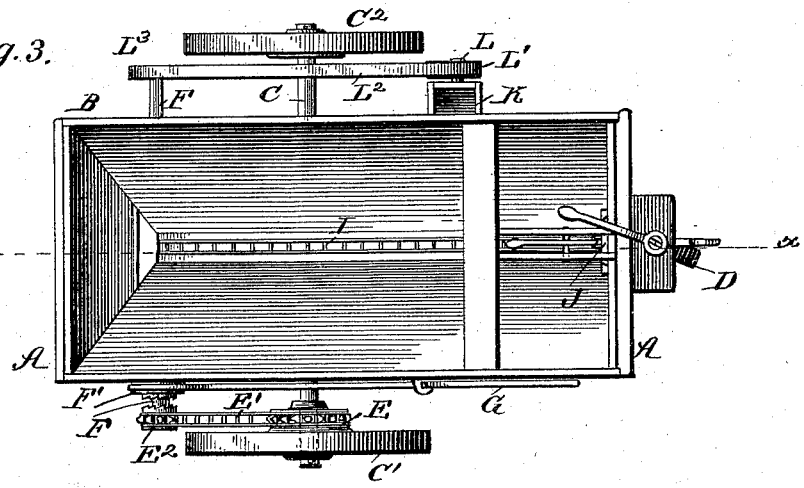
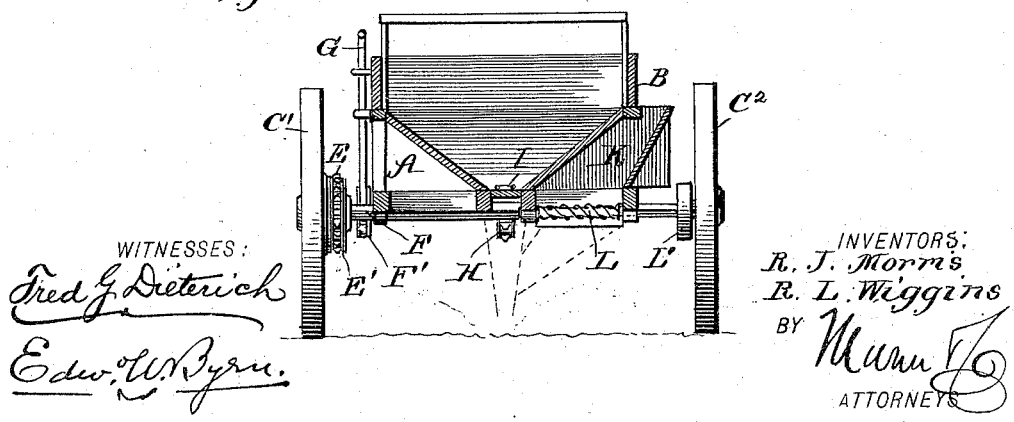

UNITED STATES PATENT OFFICE.

ROBERT J. MORRIS AND ROBERT L. WIGGINS, OF ALEXANDERVILLE, GEORGIA.

MANURE-DISTRIBUTER.

SPECIFICATION forming part of Letters Patent No. 488,445, dated December 20, 1892.

Application filed August 12, 1892. Serial No. 442,941. (No model.)

*To all whom it may concern:*

Be it known that we, ROBERT J. MORRIS and ROBERT L. WIGGINS, of Alexanderville, in the county of Echols and State of Georgia, have invented a new and useful Improvement in Manure and Guano Distributers, of which the following is a specification.

The object of our invention is to provide a machine for hauling and drilling in furrows cotton-seed compost, or stable manure in either the rough or pulverized state, and also guano, or commercial fertilizers at the same time, the machine being designed to supply the place of a cart for transporting it to the field, and also a distributer for distributing the manure in the furrow without dropping in heaps, and without transfer of bulk from one vehicle to another, thus saving a great amount of time, labor, and waste.

It consists in the peculiar construction and arrangement of parts which we will now proceed to describe with reference to the drawings in which Figure 1 is a vertical longitudinal section on line $x$—$x$ of Fig. 2. Fig. 2 is a vertical transverse section and Fig. 3 is a plan view.

In the drawings A represents the main frame composed of sub-sills with cross bars upon which is supported the body part B which contains the manure to be distributed. The body has a trough shaped bottom, and a driver's seat at its front end.

The main frame is supported near its middle upon an axle C, with running wheels C' C$^2$, and at its front end is supported upon swiveling wheel D whose upright shaft is journaled in bearings in the frame work and is provided with a lever or hand wheel at its upper end whereby it may be turned axially to guide the machine, the swiveling wheel being designed to run in and follow the furrow so as to cause the manure which falls immediately behind it to be always dropped in the furrow, even if the team should not accurately follow the furrow. A draft connection in front of the swiveling wheel serves as a point of attachment for the team.

On the hub of the right hand wheel is formed a sprocket wheel E which receives a chain belt E' that runs to a loose sprocket wheel E$^2$ on the end of a transverse shaft F journaled under the rear end of the main frame. On the end of this shaft next to the loose sprocket wheel is a clutch collar section F' which slides longitudinally on said shaft but turns rigidly with it by reason of a feather or spline. This clutch collar has locking lugs or clutch faces adapted to lock into the loose sprocket so as to turn with it and thereby rotate the shaft, or be disconnected and independent according to the position of the clutch. This clutch collar is grooved around its periphery to receive the forked end of a lever G which extends forwardly to a position near the driver's seat so as to enable him from his position to connect or disconnect the shaft. In the middle of this shaft and between the two central sills of the main frame is rigidly fastened a sprocket-wheel H, around which and over another sprocket wheel H' at the front end, there travels an endless flat chain I, whose upper portion enters the bottom of the wagon body and slides longitudinally along the bottom of the trough, entering the body at the rear and passing out at the front end. This chain forms a carrier and feeder for the manure which is discharged through the opening at the front end immediately behind the swiveling wheel in the furrow. Over this opening is arranged an adjustable slide board J which can be raised or lowered to any position desired by the operator, to regulate the flow of manure, and should the machine become choked or clogged from trash, clods &c, the board can be raised high enough to let the obstruction pass out, and be instantly lowered again, its proximity to the driver's seat permitting this to be easily done by the driver.

On the left hand side of the body near the front is the guano distributer for mixing in guano or other commercial fertilizer with the rough manure of the farm. This consists of a V-shaped body or hopper K with a narrow opening at the bottom running transversely to the wagon body, in which there turns an auger shaped feed shaft L having a pulley L' on its end that is connected by a belt L$^2$ with a corresponding pulley L$^3$ on the rear shaft.

At the bottom of the guano distributer there is designed to be an adjustable slide to close or open the aperture in regulating or shutting off the feed. There are also sloping guide chutes and canvas hose to guide the manure directly down to the furrow, to prevent it from being scattered by the wind, but these features are common and well known and need not be further described.

We are aware that it is not new to use an endless belt distributer in manure spreaders with clutch connections, and we make no broad claim on this.

By putting the distributer devices at the front end and using the swiveling wheel, the manure is delivered into the furrow and may be drilled clear to the end of the row which is impossible with a tail end discharge.

Having thus described our invention, what we claim as new and desire to secure by Letters Patent is:

1. The rough manure distributer consisting of a long trough shaped body having a forwardly moving endless chain I in its bottom, and feed regulating devices J at the front end; in combination with a distributer for commercial fertilizers arranged on the side and at the front end of the trough shaped body and consisting of a hopper shaped box K with feed slot in its bottom and a revolving shaft L arranged therein with pulley L' and belt L² for operating it, the said coarse manure distributer and commercial fertilizer distributer being arranged to discharge together into the furrow at the front end of the machine substantially as shown and described.

2. The combination of the main frame composed of sub-sills, the trough shaped body arranged above it and having discharge outlet at its front end; the endless chain belt I, sprocket wheels H H', shaft F with band pulley L³ and loose sprocket E² and clutch section F, the chain belt E' and running wheel with sprocket E, adjusting lever G, and the guano distributer arranged upon the side and provided with belt L², and the furrow wheel arranged in front and carried by a vertical axis as described.

ROBERT J. MORRIS.
RBT. L. WIGGINS.

Witnesses:
J. D. REGISTER,
G. D. REGISTER.